United States Patent Office 3,591,386
Patented July 6, 1971

3,591,386
LITHOGRAPHIC ELEMENT AND NOVEL POLYMERS CONTAINED THEREIN
Thomas I. Abbott, Donald A. Smith, and Robert H. Cunningham, Rochester, N.Y., assignors to Eastman Kodak Company, Rochester, N.Y.
No Drawing. Filed Mar. 18, 1968, Ser. No. 714,034
Int. Cl. G03c 1/72
U.S. Cl. 96—114                                    16 Claims

ABSTRACT OF THE DISCLOSURE

This invention relates to novel lithographic elements which contain a polymer which comprises (1) units of an oleophobic monomer and (2) units of a monomer containing hardenable groups thereon. In one aspect this invention relates to novel polymers which can be used in lithographic elements, said polymers comprising (1) units of a vinyl pyridinium compound and (2) units of a monomer containing hardenable groups which can be reacted with photographic hardening agents to increase the molecular weight of said polymer.

---

This invention relates to photographic emulsions, photographic elements, and to polymeric materials contained in said elements. In one aspect this invention relates to photographic emulsions containing a polymer which comprises (1) units of an oleophobic monomer and (2) units of a monomer containing hardenable groups which can be reacted with a photographic hardening agent to substantially increase the molecular weight of said polymer. In another aspect this invention relates to new lithographic elements with wider latitude to various printer inks.

Lithographic elements generally have a surface which is differentially ink-receptive when moistened with water. Usually the plate includes olephilic characters or designs which are receptive of greasy printing ink and hydrophilic areas which repel ink when moistened with water. Thus, the printing of the plate does not depend upon the printing characters being either substantially above or below the hydrophobic non-printing surface as opposed to the other plates such as relief or intaglio printing plates.

Lithographic elements having differentially ink-receptive areas have been proposed by Yackel et al., U.S. Re. 25,885, Oct. 19, 1965, wherein a hydrophilic organic colloid-silver halide film is utilized to provide an element which does not require etching or washing to remove unhardened areas. However, it is desirable to obtain better differential ink-receptiveness of the elements to achieve maximum lithographic differential between the printing areas and the non-printing areas. It is desirable to have the differential ink-receptiveness as good or better than the differential produced in costly dimetallic elements wherein copper (hydrophobic) and chromium (hydrophilic) are used to obtain distinct image separation. Efforts to achieve this objective by incorporating hydrophilic polymeric materials, such as polyacrylamide, into the gelatin emulsion have not been wholly successful as the differential ink-receptiveness deteriorated rapidly with use.

Therefore, it is an object of this invention to provide new lithographic compositions which can be used in lithographic elements.

It is another object of this invention to provide novel polymers which can be used in new photographic compositions.

It is another object of this invention to provide new photographic elements.

It is another object of this invention to provide new photographic elements having high differential ink-receptiveness.

It is a further object of this invention to provide new polymers comprising both lithographically hydrophilic units and units comprising hardenable groups which can be reacted to render the polymers water insoluble.

It is a further object of this invention to provide a novel gelatin silver halide emulsion containing polymeric materials.

It is still a further object of this invention to provide novel negative lithographic working plates and novel positive lithographic working plates.

These and other objects of the invention are accomplished with a photographic composition comprising an interpolymer which comprises (1) units which are oleophobic and (2) units containing groups which can be reacted to render the polymers water insoluble. Photographic elements containing said photographic compositions are used in lithographic plates which can be processed to provide hydrophobic areas highly receptive to greasy printing inks and hydrophilic areas which repel said ink when moistened with water.

In one embodiment of the invention a lithographic plate comprises a silver halide emulsion layer which contains said interpolymer and contiguous therewith, a silver halide developing agent (a developing agent present in the emulsion or in a layer effectively adjacent thereto). The developing agent when oxidized in a development reaction in the presence of an organic colloid (which comprises proteinaceous material and said interpolymer) reacts with said hydrophilic colloid to form an oleophilic (ink-receptive) image in the exposed areas of said emulsion layer. A solution containing a developing agent can be used, if it is not present in the radiation-sensitive element, to initiate development of the exposed silver halide and the formation thereby of the oleophilic image. Upon inking the moistened plate and printing on a lithographic printing press, the desired lithographic reproduction, which will be negative to the original, will be obtained. Negative and positive working plates can also be provided as disclosed in Yackel, above, Hill, U.S. Pat. 2,541,472 or Fallesen, U.S. Pat. 2,497,875.

In the above processes, the ink-receptive areas of the printing plates on a background of hydrophilic material are obtained by alkaline activation of a silver halide developing agent in the presence of an image-wise exposed organic colloid silver halide emulsion layer. The result is to form a silver image and oxidized developing agent in the region of development. The organic colloid of the emulsion layer may undergo some additional hardening at the same time. However, the hardening of the organic colloid layer in the region of development is incidental in this stage of the operation of the invention. The interpolymers of this invention are an especially desirable component of the organic colloid as they contain groups which will react with oxidized developer in a manner similar to gelatin to produce oleophilic image areas.

Accordingly, the silver halide developing agent is one which is capable of oxidation in the presence of the organic colloid present in the silver halide emulsion layer and whose oxidation products will react with the organic colloid to produce an image area receptive to greasy printing ink. The polyhydroxybenzene developing agents substituted with halogen, monocyclic aryl groups of the benzene series and alkyl groups of at least 2 and preferably from 2 to 6 carbon atoms have this property. The 1,2-dihydroxybenzene developing agents substituted by halogen, monocyclic aryl of the benzene series and alkyl groups of at least 2 carbon atoms and preferably 2 to 6 carbon atoms are particularly useful in the process. Silver halide developing agents possessing the necessary properties thus include certain polyhydroxybenzene developing agents and esters thereof, such as pyrogallol and substituted polyhydroxybenzene developing agents, particularly dihydroxybenzenes substituted with, for example, halogen, alkyl groups of at least 2 and preferably from 2 to 6 carbon atoms and a monocyclic aryl group of the benzene series, e.g., o - chlorohydroquinone, o - bromohydroquinone, 4-phenylcatechol, 4-t-butylcatechol, pyrogallol, 4-n-butylpyrogallol, nordihydroguaiaretic acid, 4,5-dibromocatechol, 3,5,6-tribromo-4-phenylcatechol and 1-phenyl - 3-(N-n-hexylcarboxamido)-4-[p-(β-hydroquinonylethyl)-phenylazo]-5-pyrazolone. Esters of such developing agents, e.g., formates and acetates of pyrogallol which hydrolyze in alkaline solutions can be used in the processes of the invention. In certain cases it has been found to be advantageous to include with the polyhydroxybenzene developing agent such as pyrogallol, an auxiliary developing agent such as monomethyl-p-aminophenol or a 3-pyrazolidone, which latter developing agents by themselves do not yield oleophilic images in the processes described, but which do appear to act synergistically in combination with the polyhydroxybenzenes to yield oleophilic images.

A photographic composition which is preferably utilized in lithographic elements according to this invention comprises a hydrophilic proteinaceous colloid, such as gelatin, and an interpolymer comprising (1) units of a oleophobic material (referred to hereinafter as I) and (2) units of a monomer having groups which can be reacted to render the polymer water insoluble (referred to hereinafter as II). The interpolymers comprise generally from about 98 to about 20 weight percent units of I and preferably from about 90 to about 50 weight percent units of I. Monomer II comprises from about 80 to about 2 weight percent and preferably from 10 to about 50 weight percent of said interpolymer. Units of other copolymerizable monomers may also be present as long as units of monomers I and II are present in the given concentration ranges.

The term oleophobic is used herein to define lithographically hydrophilic materials which have sufficient hydrophilicity when moistened with water to repel lithographic greasy inks, i.e., such as those used in the trade (a typical ink of this type is Web Offset Ink provided by U.S. Printing Ink Corporation). The oleophobic materials of this invention are units of a monomer which repel greasy printing inks when said units are present in a copolymer.

The units of monomers comprising groups which can be reacted to render the polymer water insoluble are those having groups such as primary amines or groups which comprise active methylene groups. Polymers containing units of this type can be hardened with conventional photographic hardening agents such as formaldehyde etc., to increase the melting point of the respective polymeric composition. The primary amine groups generally referred to herein are those which have characteristics of an alkylene amine or arylene amine and do not include groups such as amide groups.

The preferred interpolymers according to this invention are derived from monomers having ethylenically unsaturated groups therein; said interpolymers are ethenic polymers having groups represented by the formula

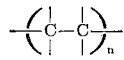

in the backbone of the polymeric chain.

In one preferred embodiment of the invention the interpolymers comprise units of monomer I represented by the following formula:

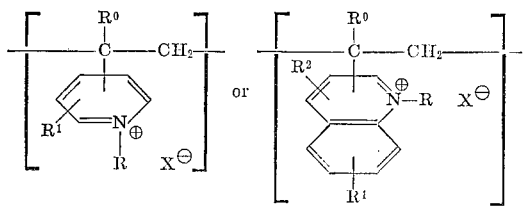

wherein $R^0$ is a hydrogen atom or a lower alkyl group; Represents an alkyl group and preferably a lower alkyl group such as methyl, ethyl, n-propyl, n-butyl, isobutyl, n-amyl, isoamyl, n-hexyl and the like; $R^1$ and $R^2$ are hydrogen atoms or alkyl groups such as methyl, ethyl, n-propyl, n-butyl and the like, and X represents an anion such as an arylsulfonate anion, e.g., a benzenesulfonate anion, a p-toluenesulfonate anion, etc.; an alkylsulfate anion, e.g., methyl sulfate, ethyl sulfate, n-butyl sulfate, etc.; a halide anion, e.g., an iodide, chloride, or bromide anion; or other anions. In a preferred embodiment, the vinyl group is in the 5 position on the pyridinium ring. Typical interpolymers containing units of this monomer are prepared by copolymerizing a vinylpyridinium salt with a monomer of type II, described above, in aqueous solution, preferably aqueous alcohol, acetone, or mixture thereof, in the presence of a suitable polymerization catalyst, for example, azobis (isobutyronitrile).

In another embodiment acrylamide monomers or acrylic monomers containing a sulfonate group thereon can be used to form the oleophobic unit of the copolymers of this invention. The acrylic monomers contain the characteristic

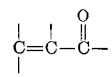

group. The sulfonate groups are generally represented by $-SO_3^-$ and can be attached to the acrylic group in a manner to provide sulfobetaines, 3-acrylolyoxypropane-1-sulfonates and the like. Typical monomers of this type are disclosed in Belgian Pat. 680,766 issued Nov. 9, 1966, and Belgian Pat. 679,412 issued Oct. 12, 1966. In a preferred embodiment the monomer used to form the oleophobic units are sulfonated units such as 3-acryloyloxy-1-methylpropane-1-sulfonic acid, sodium salt; 3-acryloyloxypropane-1-sulfonic acid, sodium salt; and the like.

Additional polymers useful in lithographic working plates according to this invention contain oleophobic units such as those represented by the following formula. These are also units of monomer I and are represented as follows:

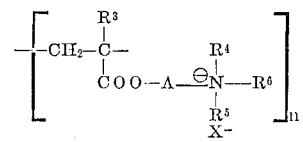

wherein A is an alkylene group such as methylene, ethylene, propylene and the like; $R^3$ is a hydrogen atom or an alkyl group such as methyl, ethyl, propyl, n-butyl, t-butyl and the like; $R^4$, $R^5$ and $R^6$ are alkyl groups as defined for $R^3$ or along with the N atom to which they are attached, $R^4$ and $R^5$ can be the necessary atoms to form a heterocyclic group such as

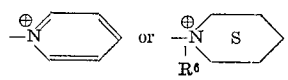

The units of monomer II contain reactive groups, which can be reacted to form water insoluble polymers and which provide potentially reactive sites for oxidized developers. The units can generally comprise primary amines and preferably comprise an active methylene group such as in malonic ester groups, acetoacetic ester groups, cyanoacetic ester groups or 1,3-diketone groups, for example, as disclosed in Smith, U.S. Ser. No. 625,593 filed Mar. 24, 1967, now U.S. 3,488,708, issued Feb. 6, 1970. The monomer (II) used to form the units are preferably acrylic monomers, i.e., those monomers having the characteristic acrylic group

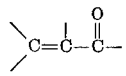

Typical monomers of this type are 2-acetoacetoxyethyl methacrylate,
2-[2-(methacryloyloxy)-ethyl] isothiouronium methanesulfonate,
N-cyanoacetyl-N'-methacryloylhydrazine,
N-methacryloyl-N'-glycylhydrazine hydrochloride,
2-aminoethyl methacrylate hydrochloride, and the like.

The organic colloid which can be advantageously utilized in lithographic elements comprises the above interpolymers and at least one other organic material. Preferred materials are the hydrophilic proteinaceous materials which include gelatin, soy bean protein, colloidal albumin, casein and the like. Generally, a lithographic emulsion composition comprises from about 98% to about 5% of said proteinaceous material, by weight, and from about 2% to about 95% of said interpolymer. Preferably, the composition comprises from about 10% to about 80%, by weight, of said interpolymer. Other synthetic polymeric materials such as polyvinyl alcohol, cellulose derivatives such as hydrolyzed cellulose esters, and alkyl acrylate polymers including the water insoluble latex polymers prepared from acrylic acid, sulfoalkyl acrylates, or methacrylates can also be used in the lithographic compositions. Thus, the system is not as highly dependent on proteinaceous materials as the prior art systems. The interpolymers of the present invention generally provide the most reactive reaction sites for the oxidized developers.

In one preferred embodiment of this invention bisaldehydes are used to provide the necessary hardness in the working element. The bisaldehydes provide shorter activation times than required for other conventional hardeners. Typical bisaldehydes which provide decreased activation time in the element include β-methyl glutaraldehyde, glutaraldehyde, succinic dialdehyde, butyl maleic dialdehyde and the like. Typical hardeners of this type are disclosed in Allen and Burness, U.S. Pat. 3,232,764 issued Feb. 1, 1966.

Various silver salts can be used as the radiation sensitive salt, such as silver bromide, silver iodide, silver chloride or mixed silver halides such as silver chlorobromide, silver bromoiodide and the like.

Various alkaline materials can be used in the solutions for activation of the exposed sensitive elements, e.g., alkali metal carbonates, caustic alkali quaternary ammonium hydroxides, amines, etc.

Direct positive emulsions may be used in lithographic elements according to this invention. Typical emulsions include (1) solarizing silver halide emulsions and (2) internal latent image silver halide emulsions forming the latent image mostly inside the silver halide grains.

The solarizing direct positive silver halide emulsions are silver halide emulsions which have been effectively fogged either chemically or by radiation, to a pont which corresponds approximately to the maximum density of the reversal curve as shown by Mees, The Theory of the Photographic Process, published by Macmillan Co., New York, N.Y., 1942, pages 261–297.

Typical methods for the preparation of solarizing emulsions are shown by Groves British Pat. 443,245, Feb. 25, 1936, who subjected an emulsion to Rüntgen rays "until the emulsion layer, when developed without additional exposure, is blackened up to the apex of its gradation curve"; Szaz British Pat. 462,730, Mar. 15, 1937, the use of either light or chemicals such as silver nitrate, organic sulfur compounds and dyes to convert ordinary silver halide emulsions to solarizing direct positive emulsions; Arens, U.S. Pat. 2,005,837, June 25, 1935, the use of silver nitrate and other compounds in conjunction with heat to effect solarization of the silver halide, and Leermakers, U.S. Pat. 2,184,013, the use of large concentrations of non-acid optical sensitizing dyes and reducing agents to effect solarization.

Kendall and Hill, U.S. Pat. 2,541,472, Feb. 13, 1951, shows useful solarizing emulsions particularly susceptible to an exposure with long wavelength light to produce a Herschel effect described by Mees above, produced by adding nitro substituted electron acceptors and other compounds to the emulsion which is fogged either chemically or with white light. In using the emulsions, a sufficient reversal image exposure is employed using minus blue light of from about 500–700 millimicrons wavelengths, preferably 520–540 millimicrons, to substantially destroy the latent image in the silver halide grains in the region of the image exposure. In these procedures, of course, only non-hardening chemicals are selected for use in fogging the solarizing emulsions if an emulsion is used requiring a given hardness.

Conventional silver halide developing solutions can be used to develop a direct positive image in the solarizing emulsions.

The internal latent image direct positive silver halide emulsions used in the invention are those well known in the art which upon exposure form the latent image mostly inside the silver halide grains, the direct positive properties of the emulsions being attributable to the crystalline structure of the silver halide grains. That is, a number of authorities in the field of photography have shown that there are imperfections or flaws, in the crystal structure (on the surface or internally) of silver halide which is used in photography, at which flaws the latent image forms by trapping photoelectrons to give development centers. Development, therefore, commences at the sites of these flaws. Journal of Photographic Science. "Photographic Sensitivity," text of a lecture given on July 1, 1957, by J. W. Mitchell: vol. 6, No. 3 (1958).

Other photographic reversal emulsions may be used including those containing grains comprising a central core of a water insoluble silver salt containing centers which promote the deposition of photolytic silver and an outer shell or covering for such core of a fogged or spontaneously developable water insoluble silver salt. The fogged shell of such grains is developed to silver without exposure. Emulsions of this type are described in Berriman, U.S. patent application, Ser. No. 448,467 filed Apr. 15, 1965, now U.S. 3,367,778, issued Feb. 6, 1968.

Before the shell of water insoluble silver salt is added to the silver salt core, the core forming emulsion is first chemically or physically treated by methods previously described in the prior art to produce centers which promote the deposition of photolytic silver, i.e., latent image nucleating centers. Such centers can be obtained by various techniques as described by Antione Hautot and Henri Saubenier in Science et Industries Photographiques, Vol. XXVIII, January 1957, pages 57–65, are particularly useful. Such chemical sensitization includes three major classes, namely, gold or noble metal sensitization, sulfur sensitization, such as labile sulfur compound and reduction sensitization, i.e., treatment of the silver halide with a strong reducing agent which introduces small specks of metallic silver into the silver salt crystal or grain.

The core forming emulsions can be chemically sensitized by any method suitable for this purpose. For example, the core forming emulsions can be digested with naturally active gelatin or sulfur compounds can be added to those described in Shepard, U.S. Pat. 1,574,944, issued Mar. 2, 1926, Shepard et al., U.S. Pat. 1,623,499, issued Apr. 5, 1927, and Shepard et al., U.S. Pat. 2,410,689, issued Nov. 5, 1946.

The core forming emulsions can also be chemically sensitized with gold salts as described in Waller et al., U.S. Pat. 2,399,083, issued Apr. 23, 1946, and Damschroder et al., U.S. Pat. 2,642,361, issued June 16, 1953. Suitable compounds are potassium chloroaurite, potassium aurithiocyanate, potassium chloroaurate, aurictrichloride and 2-aurosulfobenzothiazole methylchloride.

The core forming emulsions can also be chemically sensitized with reducing agents, such as stannous salts (Carroll, U.S. Pat. 2,487,850, issued Nov. 15, 1949), polyamines such as diethylenetriamine (Lowe and Jones, U.S. Pat. 2,618,598, issued Aug. 15, 1950), polyamines such as spermine (Lowe and Allen, U.S. Pat. 2,521,925, issued Sept. 12, 1950) or bis-(β-aminoethyl)sulfide and its water soluble salts (Lowe and Jones, U.S. Pat. 2,521,926, issued Sept. 12, 1950).

The shell of the grains comprising the emulsions used in practicing this invention is prepared by precipitating over the core grains a light sensitive water insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot.

DEVELOPER A

|   | Grams |
|---|---|
| N-methyl-p-aminophenol sulfate | 2.5 |
| Ascorbic acid | 10.0 |
| Potassium metaborate | 35.0 |
| Potassium bromide | 1.0 |

Water to 1 liter.
pH of 9.6.

Such fogging can be effected by chemically sensitizing to fog with the sensitizing agents described for chemically sensitizing the core forming emulsion, high intensity light and like fogging means well known to those skilled in the art. While the core need not be sensitized to fog, the shell is fogged, for example, reduction fogged with a reducing agent such as stannous chloride. Fogging by means of a reduction sensitizer, a nobel metal salt such as gold salt plus a reduction sensitizer, high pH and low pAg silver halide precipitating conditions, and the like can be suitably utilized. The shell porton of the subject grains can also be coated prior to fogging.

Another direct positive silver halide emulsion which can be used is a fogged direct positive silver halide emulsion comprising silver halide grains which have a uniform diameter frequency distribution, i.e., silver halide grains which have substantially uniform diameter. In one embodiment of this type of emulsion, the direct positive photographic emulsion comprises fogged silver halide grains, at least 95%, by weight, of said grains having a diameter which is within about 40% of the mean grain diameter. Preferably, photographic emulsions of this type comprise reduction and gold fogged silver halide grains and a compound which accepts electrons. The use of low concentrations of reduction and gold fogging agents, in preparing such emulsions gives unique fogged silver halide grains which are characterized by a very high photographic speed in conventional photographic processing solutions.

The silver halide emulsion of a photographic element which is useful in the instant invention can be coated on a wide variety of supports. Typical supports are cellulose nitrate film, cellulose ester film, polyvinyl acetal film, polystyrene film, poly(ethylene terephthalate) film and related films or resinous materials as well as glass, paper, metal and the like. Supports such as paper which are coated with α-olefin polymers, particularly polymers of α-olefins containing two or more carbon atoms, as exemplified by polyethylene, polypropylene, ethylenebutene copolymers and the like can also be employed.

This invention can be further illustrated by the following examples.

EXAMPLE 1

Preparation of copoly(1,2-dimethyl-5-vinylpyridinium methosulfate—N-methacryloyl - N' - cyanoacetylhydrazine) (70:30)

A mixture of 350 g. of 1,2-dimethyl-5-vinylpyridinium methosulfate, 150 g. of N-methacryloyl-N'-cyanocetylhydrazine and 1500 ml. of distilled water is placed in a polymerization flask and flushed with nitrogen. To this mixture is added while stirring a solution of 6.0 g. of azobis(isobutyronitrile) in 160 ml. of acetone and 100 ml. of ethanol. The polymerization is carried out for 18 hours at 60° C. Dilution of the contents of the flask after this time with 2400 ml. of water provided a solution containing 10 percent solids.

EXAMPLE 2

Preparation of copoly[1,2-dimethyl-5-vinylpyridinium methosulfate — N - (2-methacryloxyoxy)cyanoacetamide] (80:20)

A solution of 8 g. of 1,2-dimethyl-5-vinylpyridinium methosulfate in 28 ml. of distilled water is placed in a polymerization flask and flushed with nitrogen. A solution of 2 g. of N-[2-methacryloyloxyethyl]-cyanoacetamide and 0.05 g. of azobis (isobutyrontrile) in 20 ml. of acetone and 5 ml. of ethyl alcohol are added with agitation. The polymerization is continued for 60 hours at 60° C. The resulting mixture contains 10 percent solids.

EXAMPLE 3

Preparation of copoly(1,2-dimethyl-5-vinylipyridinium methosulfate— 2 -acetoacetoxyethyl methylacrylate) (90:10)

A solution of 22.5 g. of 1,2-dimethyl-5-vinylpyridinium methosulfate in 25 ml. of distilled water is placed in a polymerization flask and flushed with nitrogen. A solution of 2.5 g. of 2-acetoacetoxyethyl methacrylate and 0.1 g. of azobis(isobutyronitrile) in 5 ml. of acetone and 5 ml. of ethyl alcohol is added with stirring. The polymerization is continued for 18 hours at 60° C. The contents of the flask are then diluted with 200 ml. of distilled water to provide a solution containing 10.4 percent solids.

EXAMPLE 4

Preparation of copoly{1,2-dimethyl-5-vinylpyridinium methosulfate—2-[2 - (methacryloyloxy)ethyl]isothiuronium methanesulfonate} (90:10)

A solution of 22.5 g. of 1,2-dimethyl-5-vinylpyridinium methosulfate in 25 ml. of distilled $H_2O$ is placed in a polymerization flask and flushed with nitrogen. To this is added with stirring a solution of 2.5 g. of [2-(2-methacryloyloxy)ethyl]isothiuronium methanesulfonate and 0.1 g. of azobis(isobutyronitrile) in 5 ml. of acetone and 5 ml. of ethyl alcohol. The polymerization is carried out at 60° C. for 18 hours. The contents of the flask are diluted with 200 ml. of distilled $H_2O$ to provide a mixture containing 10.2 percent solids.

EXAMPLE 5

Preparation of copoly(3-acryloyloxypropane-1-sulfonic acid, sodium salt—N-methacryloyl-N'-glycylhydrazine hydrochloride) (90:10)

A solution of 45 g. of 3-acryloyloxypropane-1-sulfonic acid sodium salt and 5 g. of N-methacryloyl-N'-glycylhydrazine hydrochloride in 360 ml. of distilled water is placed in a polymerization flask and flushed with nitrogen. To this is added with stirring a solution of 0.6 g. of azobis(isobutyronitrile) in 90 ml. of ethyl alcohol. The polymerization is carried out at 60° C. for 18 hours. The resulting solution contains 10.4 percent solids.

EXAMPLE 6

Preparation of copoly(1,2-dimethyl-5-vinylpyridinium methosulfate—2-aminoethyl methacrylate hydrochloride) (80:20)

A solution of 8 g. of 1,2-dimethyl-5-vinylpyridinium methosulfate and 2 g. of 2-aminoethylmethacrylate hydrochloride in 40 ml. of distilled $H_2O$ is placed in a polymerization flask and flushed with nitrogen. To this is added with stirring 0.05 g. potassium persulfate. The polymerization is carried out at 60° C. for 60 hours, cooled and diluted to 100 ml. to provide a solution containing 10 percent solids.

EXAMPLE 7

Preparation of copoly(acrylamide—2-acetoacetoxyethyl methacrylate) (90:10)

A solution of 90 g. of acrylamide in 850 ml. of distilled $H_2O$ is placed in a polymerization flask and flushed with nitrogen. To this is added with stirring a solution of 0.3 g. azobis(isobutyronitrile) and 10 g. of 2-acetoacetoxyethyl methacrylate and 200 ml. of ethyl alcohol. The polymerization is carried out at 60° C. for 18 hours to provide a mixture containing 9.3 percent solids.

EXAMPLE 8

Preparation of copoly(acrylamide—N-cyanoacetyl-N'-methacryloylhydrazine) (90:10)

A solution of 45 g. of acrylamide and 5 g. of N-cyanoacetyl-N'-methacryloylhydrazine in 350 ml. of distilled water is placed in a polymerization flask and flushed with nitrogen. To this is added with stirring 0.6 g. of azobis-(isobutyronitrile) in 150 ml. of ethyl alcohol. The polymerization was carried out at 60° C. for 6.5 hours. After cooling, the resulting solution containing 10 percent solids is utilized according to Example 11.

EXAMPLE 9

A negative lithographic element is prepared as follows: A gelatino silver chloride emulsion (0.6 mole Ag) containing 100 g. of gelatin per mole of silver is melted and blended with 180 g. of a 10% gelatin solution, 720 g. of the copolymer of Example 1, 18 ml. of 15% saponin solution and 594 ml. of distilled water.

A developer-hardener composition is prepared by mixing 50 g. of a 4-phenylcatechol dispersion in tricresyl phosphate, 3 ml. of 15% saponin solution, 15 ml. of a 10% formaldehyde solution and 412 ml. of distilled water. The 4-phenylcatechol dispersion in tricresyl phosphate is prepared by adding with rapid stirring a solution of 500 g. of 10% gelatin in 50 ml. of 7.5% saponin at 40° C. to a solution of 50 g. of 4-phenylcatechol dissolved in 100 g. of tricresyl phosphate at 70° C. The mixture is cooled and colloid milled before adding to the developer-hardener composition. The respective silver chloride emulsion composition and developer-hardener composition are coated by the method described in U.S. Pat. 2,912,345, on a polyethylene coated paper support at a coverage of 5.0 g. per sq. ft. of each composition.

The element is given a stepwise exposure along with a similar control coating which did not contain a copolymer of this invention. Both coatings are then activated in an 8% tripotassium phosphate solution at 85° F. for 20 seconds, submersed in a 2% phosphoric acid stop bath for 20 seconds and squeegeed.

The moist elements are then utilized on a lithographic printing press with the following printing inks:

Ink No. 1, which is a tacky high viscosity ink, provided sharp, clear, dark images in the print area and clear background areas in both the control element and an element prepared according to this invention.

Ink No. 2, which is a medium tack and medium viscosity ink, prints well in the image area but tones the background area after only a few copies are made with the control element. The element prepared according to this invention had clear, sharp, dark images and the background remains clear after several hundred copies are made from the element.

Ink No. 3, which is a very low tack ink and of low viscosity, inks indiscriminately over the entire control sample providing only slight definition in the image areas. The element prepared according to this invention inks well in the image area and runs clearly in the background.

It is apparent that the lithographic elements of this invention which contain certain copolymers provide improved latitude to various printing inks.

Similar improved results are obtained when the copolymers of Examples 2–6 are utilized in the lithographic elements.

EXAMPLE 10

A positive lithographic element is prepared as follows:

A developer-hardener layer is prepared with 4-phenylcatechol dispersed in tricresyl phosphate, gelatin, saponin and formaldehyde and coated on a polyethylene coated paper support at 50 mg. of 4-phenylcatechol per ft.$^2$, and 600 mg. of gelatin per ft.$^2$. The layer contained 6% formaldehyde, by weight, based on gelatin.

A negative emulsion layer containing silver chloride, gelatin, saponin and formaldehyde is coated over the developer-hardener layer at 146 mg. of silver per ft.$^2$ and 250 mg. of gelatin per square foot. The layer contained 6% formaldehyde, by weight, of the gelatin.

A fogged emulsion layer is prepared as follows: A silver chloride gelatin emulsion, fogged with a 0.1% solution of $Na_2S_2O_3$ was mixed with a 10% gelatin solution, saponin and 10% solution of the copolymer of Example 1, and coated over the negative emulsion layer at 72 mg. of Ag per ft.$^2$, 120 mg. of gelatin per ft.$^2$ and 120 mg. of copolymer per ft.$^2$. The formaldehyde diffuses from the other layers into the fogged emulsion layer hardening the layer.

The lithographic element is given a stepwise exposure along with a similar control coating which did not contain a copolymer of this invention. Both coatings are then activated in an 8% tripotassium phosphate solution at 85° F. for 20 seconds; submersed in a 2% phosphoric acid stop bath for 20 seconds and squeegeed.

The moist elements are then utilized on a lithographic printing press with the following printing inks:

Ink No. 1, which is a tacky high viscosity ink, provided sharp, clear, dark images in the print area and clear background areas in both the control element and an element prepared according to this invention.

Ink No. 2, which is a medium tack and medium viscosity ink, prints well in the image area, but tones the background area after only a few copies are made with the control element. The element prepared according to this invention had clear, sharp, dark images and the background remains clear after several hundred copies are made from the element.

Ink No. 3, which is a very low tack ink and of low viscosity, inks indiscriminately over the entire control sample providing only slight definition in the image areas. The element prepared according to this invention inks well in the image area and runs clearly in the background.

EXAMPLE 11

A negative lithographic plate is made using copoly (acrylamide-N-cyanoacetyl-N'-methacryloylhydrazine) of Example 8.

A developer-hardener layer containing a 4-phenylcatechol suspension in tricresyl phosphate, gelatin, saponin and formaldehyde is coated on a cellulose acetate support at 100 mg. of 4-phenylcatechol per sq. ft.$^2$ and 500 mg. of gelatin per ft.$^2$. The layer contained 6% formaldehyde based on the weight of the gelatin.

A gelatino silver chloride emulsion containing saponin and formaldehyde is mixed with a solution of poly(acrylamide-N-cyanoacetyl-N'-methacryloylhydrazine) just prior to coating and the resultant mixture is coated on the developer-hardener layer at 108 mg. of Ag per ft.$^2$, 125 mg. of gelatin per ft.$^2$ and 125 mg. of said copolymer per square foot.

The above element is exposed two seconds to a .15 density increment step tablet in addition to a line negative with a No. 2 photoflood bulb.

The element is contacted for thirty seconds in 4 percent β-diethylaminoethanol activator at room temperature and for 20 seconds in a 2% H$_3$PO$_4$ solution stop bath.

The element is subjected to a test run on a lithographic press using the lithographic inks of Example 9. The background areas of this coating ran without tone for several copies with all of the lithographic inks tested, and the developed areas printed clear, sharp images.

A similar lithographic element containing no copoly (acrylamide - N - cyanoacetyl-N'-methacryloylhydrazine) in the emulsion layer tones in the background area with most lithographic inks tested above whereas the lithographic element, described above, does not tone in the background.

EXAMPLE 12

A negative lithographic element containing copoly (acrylamide-2-acetoacetoxyethyl methacrylate) of Example 7 is prepared as follows:

A developer-hardener layer containing 4-phenylcatechol dispersed in tricresylphosphate, gelatin, formaldehyde and Triton X-200 (TM for p-tert-octyl-phenoxyethoxyethylsulfonate-sodium salt) is coated on a cellulose acetate support at 50 mg. of 4-phenylcatechol per ft.$^2$ and 793 mg. of gelatin per square foot.

A silver chloride emulsion containing sensitizing dyes and formaldehyde is mixed just prior to coating with a solution of 8% copoly(acrylamide-2-acetoacetoxyethyl methacrylate) and coated on the developer-hardener layer at 100 g. of Ag per ft.$^2$, 125 g. of said copolymer per ft.$^2$ and 115 mg. of gelatin per square foot.

The element is exposed and then activated per 30 seconds at 85° F. in 4% Na$_3$PO$_4$+4% K$_3$PO$_4$ solution. It is then put in a stop bath comprising 2% H$_3$PO$_4$ solution for twenty seconds.

The element is then subjected to a lithographic press run using a low viscosity, low tack ink (Web Offset Ink—U.S. Printing Ink Corporation). The background areas of this coating ran without tone, while image areas inked clearly.

A similar lithographic element comprising polyacrylamide in place of said copolymer, above, does not have the initial image clarity and gradually tones in the background upon running successive copies.

EXAMPLE 13

Bisaldehyde hardeners are preferably used to provide short activation times in position elements after aging.

A positive lithographic element is prepared as follows:

A developer-hardener layer is prepared with 4-phenylcatechol dispersed in tricresyl phosphate, gelatin, saponin, and 10% succinaldehyde solution and coated on a polyethylene coated paper support at 50 mg./ft.$^2$ of 4-phenylcatechol and 600 mg./ft.$^2$ of gelatin. The layer contained 3%, by weight, succinaldehyde based on gelatin.

A negative emulsion layer containing silver chloride, gelatin, saponin, and 10% succinaldehyde solution is coated over the developer-hardener layer at 146 mg. of silver per ft.$^2$ and 250 mg./ft.$^2$ of gelatin. The layer contained 3%, by weight, of succinaldehyde based on the gelatin.

A fogged emulsion layer is prepared as follows: A silver chloride gelatin emulsion, fogged with Na$_2$S$_2$O$_3$ solution was mixed with a 10% gelatin solution (10% succinaldehyde solution), saponin and a 10% solution of the copolymer of Example 1 and coated over the negative emulsion layer at 54 mg. of Ag per ft.$^2$, 90 mg. of gelatin per ft.$^2$ and 90 mg. of copolymer per ft.$^2$.

The lithographic element is tested as described in Example 9.

The activation time of this lithographic element was 20 seconds as compared with a similar positive element hardened with formaldehyde which has an activation time of 60 seconds.

The invention has been described in considerable detail with reference to preferred embodiments thereof, but it will be understood that variations and modifications can be effected within the spirit and scope of the invention as set forth hereinabove and in the appended claims.

We claim:

1. A lithographic element comprising a silver halide layer containing a proteinaceous material and an interpolymer which comprises (1) units of an oleophobic monomer and (2) units of an ethenic monomer containing a hardenable group.

2. An element according to claim 1 wherein said hardenable groups are active methylene groups or primary amine groups.

3. An element according to claim 1 wherein said oleophobic monomer is a vinyl pyridinium compound, a 3-acryloyloxyalkyl sulfonate or acrylamide.

4. An element according to claim 1 wherein said proteinaceous material is gelatin.

5. An element according to claim 1 wherein said oleophobic monomer is a vinyl pyridinium compound.

6. An element according to claim 1 wherein said composition comprises from about 10 to about 80%, by weight, of said interpolymer.

7. An element according to claim 1 wherein said interpolymer comprises from about 98 to about 20%, by weight, units of said oleophobic monomer.

8. An element according to claim 1 wherein said units of said oleophobic monomer are represented by

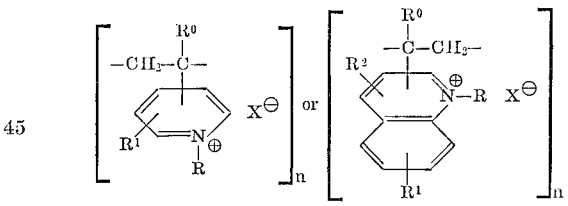

wherein $n$ is a positive integer of 1 or greater, $R^0$ represents a hydrogen atom or a lower alkyl group, R represents an alkyl group, $R^1$ and $R^2$ represent hydrogen atoms or alkyl groups and X represents an anion.

9. An element according to claim 8 wherein the pyridinium ring is attached to the polymer background through the 5 position of the ring.

10. An element according to claim 1 wherein said units of monomer containing hardenable groups are units derived from 2-acetoacetoxyethyl methacrylate, 2-[2-(methacryloyloxy)ethyl]isothiuronium methane sulfonate, N-cyanoacetyl-N'-methacryloylhydrazine, N - methacryloyl-N'-glycylhydrazine hydrochloride or 2-aminoethyl methacrylate hydrochloride.

11. A lithographic element according to claim 1 wherein said element further comprises a second layer having a polyhydroxybenzene silver halide developing agent therein, a third layer comprising a gelatino silver halide emulsion and wherein said layer containing said interpolymer comprises a fogged silver halide.

12. A lithographic element according to claim 1 comprising a fogged silver halide emulsion.

13. A lithographic element according to claim 1 which has been hardened with a bisaldehyde hardener.

14. A lithographic, silver halide radiation-sensitive composition comprising a proteinaceous material and an interpolymer which comprises units of acrylamide and units of 2-acetoacetoxyethyl methacrylate.

15. A lithographic composition according to claim 14 comprising a silver halide.

16. A lithographic composition according to claim 15 wherein said interpolymer is copoly(acrylamide-2-acetoacetoxyethyl methacrylate).

References Cited

UNITED STATES PATENTS

| 2,972,535 | 2/1961 | Laakso | 96—114X |
| 3,183,219 | 5/1965 | Schuler | 96—114X |
| 3,488,708 | 1/1970 | Smith | 96—87X |

NORMAN G. TORCHIN, Primary Examiner

J. L. GOODROW, Assistant Examiner

U.S. Cl. X.R.

96—76